(12) United States Patent
Minagata et al.

(10) Patent No.: US 9,871,243 B2
(45) Date of Patent: Jan. 16, 2018

(54) ELECTRIC ACCUMULATION DEVICE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/124,708

(22) PCT Filed: Feb. 17, 2015

(86) PCT No.: PCT/JP2015/054315
§ 371 (c)(1),
(2) Date: Sep. 9, 2016

(87) PCT Pub. No.: WO2015/137060
PCT Pub. Date: Sep. 17, 2015

(65) Prior Publication Data
US 2017/0018753 A1  Jan. 19, 2017

(30) Foreign Application Priority Data
Mar. 13, 2014 (JP) ................................. 2014-050348

(51) Int. Cl.
*H01M 10/0525* (2010.01)
*H01M 2/26* (2006.01)
(Continued)

(52) U.S. Cl.
CPC ............ *H01M 2/266* (2013.01); *H01G 11/12* (2013.01); *H01G 11/78* (2013.01);
(Continued)

(58) Field of Classification Search
CPC ..................... H01M 10/0525; H01M 10/425
See application file for complete search history.

(56) References Cited

U.S. PATENT DOCUMENTS

| 6,145,280 A * | 11/2000 | Daroux | ............... H01M 2/0275 29/623.2 |
|---|---|---|---|
| 2003/0113618 A1 * | 6/2003 | Xing | ..................... H01M 2/021 429/129 |

(Continued)

FOREIGN PATENT DOCUMENTS

| JP | 2003-187873 A | 7/2003 |
|---|---|---|
| JP | 2007-335307 A | 12/2007 |

(Continued)

OTHER PUBLICATIONS

International Preliminary Report on Patentability dated Sep. 13, 2016 from the International Bureau in counterpart International Application No. PCT/JP2015/054315.

(Continued)

*Primary Examiner* — Olatunji Godo
(74) *Attorney, Agent, or Firm* — Sughrue Mion, PLLC

(57) ABSTRACT

Immobilization tapes include first immobilization tapes disposed across an electrode assembly upper edge, second immobilization tapes disposed across the electrode assembly lower edge, and third immobilization tapes disposed across the electrode assembly side edges. The first immobilization tapes are disposed on the outer sides of two protrusion positions from a positive electrode tab and a negative electrode tab within the electrode assembly upper edge. One pair or more each of the first, second and third immobilization tapes are disposed over the electrode assembly. In the length direction of the electrode assembly upper edge, each of the first, second and third immobilization tape pairs is disposed symmetrically, centered around a central line (Continued)

extending in the top-down direction from the midpoint of the electrode assembly upper edge.

7 Claims, 4 Drawing Sheets

(51) Int. Cl.
- *H01G 11/12* (2013.01)
- *H01M 10/04* (2006.01)
- *H01G 11/78* (2013.01)
- *H01M 2/02* (2006.01)
- *H01M 2/36* (2006.01)

(52) U.S. Cl.
CPC ......... *H01M 2/0262* (2013.01); *H01M 2/362* (2013.01); *H01M 10/04* (2013.01); *H01M 10/0525* (2013.01); *H01M 2220/20* (2013.01); *Y02E 60/13* (2013.01); *Y02T 10/7022* (2013.01)

(56) References Cited

U.S. PATENT DOCUMENTS

| | | | |
|---|---|---|---|
| 2008/0233474 A1* | 9/2008 | Son | H01M 2/18 429/129 |
| 2013/0052510 A1 | 2/2013 | Miyazaki et al. | |
| 2015/0340663 A1 | 11/2015 | Minagata et al. | |

FOREIGN PATENT DOCUMENTS

| | | |
|---|---|---|
| JP | 2010-80324 A | 4/2010 |
| JP | 2013-48054 A | 3/2013 |
| JP | 2013-254628 A | 12/2013 |
| JP | 2014-11115 A | 1/2014 |
| JP | 2014-78447 A | 5/2014 |
| WO | 2013/146513 A1 | 10/2013 |
| WO | 2014002647 A1 | 1/2014 |

OTHER PUBLICATIONS

Communication dated Mar. 9, 2017, from the German Patent Office in counterpart German application No. 11 2015 001 210.9.

* cited by examiner

ELECTRIC ACCUMULATION DEVICE

CROSS REFERENCE TO RELATED APPLICATIONS

This application is a National Stage of International Application No. PCT/JP2015/054315 filed Feb. 17, 2015, claiming priority based on Japanese Patent Application No. 2014-050348 filed Mar. 13, 2014, the contents of all of which are incorporated herein by reference in their entirety.

TECHNICAL FIELD

The present invention relates to a power storage device.

BACKGROUND ART

A vehicle such as an electric vehicle (EV) or a plug-in hybrid vehicle includes rechargeable batteries such as lithium-ion batteries. A rechargeable battery is a power storage device that stores power supplied to an electric motor serving as a prime mover. The rechargeable battery includes an electrode assembly and a case that accommodates the electrode assembly. The electrode assembly includes a rectangular positive electrode including a positive electrode active material layer and a rectangular negative electrode layer including a negative electrode active material that are stacked with a separator arranged between the positive electrode and the negative electrode. Patent Documents 1 to 3 each disclose a structure in which the electrodes and the separator of the electrode assembly are fastened with fastening tapes.

To increase the contact properties of each electrode and limit displacement of each electrode, load may be applied in the stacking direction of the electrodes to regions opposing the active material layers. Further, when the electrode assembly expands during charging and discharging, the case may apply load to the opposing regions. In addition, in an assembled battery including a plurality of stacked power storage devices that are connected in series to one another, a constraining load may be applied in the stacking direction to each of the power storage devices. In these cases, ion deposits resulting from electrical conduction easily collect at a portion where the gap is large between the electrode assembly and the inner surface of the case.

Further, the load applied from the case is apt to concentrate at the fastening tape located between the electrode assembly and the inner surface of the case. Thus, the load applied to the fastening tape has a tendency to become uneven depending on the applied position of the fastening tape. This may generate ion deposits.

Referring to FIG. 5, Patent Document 1 describes a rechargeable battery in which fastening tapes 112 are applied to each of two side ends 111 of an electrode assembly 110. That is, the ends of the electrode assembly 110 other than the side ends 111, namely, an upper end 113 and a lower end 114 are not fastened by the fastening tapes 112. This may displace the upper end 113 and the lower end 114 of each electrode in the electrode assembly 110.

Referring to FIG. 6, Patent Document 2 describes a rechargeable battery in which fastening tapes 122 are applied to two side ends 121, an upper end 123, and a lower end 124 of an electrode assembly 120. The fastening tape 122 applied to the upper end 123 of the electrode assembly 120 is located between positive electrode tabs 125 and negative electrode tabs 126 that project from the upper end 123. Thus, the fastening tape 122 may hinder the impregnation of the electrode assembly 120 with electrolytic solution between the electrodes.

Referring to FIG. 7, Patent Document 3 describes a rechargeable battery in which fastening tapes 132 are applied to two side ends 131, an upper end 133, and a lower end 134 of an electrode assembly 130. In this case, the fastening tapes 132 are applied entirely to the side ends 131 of the electrode assembly 130. Thus, as compared to when the fastening tapes 132 are partially applied to the side ends 131, a wider range of the electrode assembly 130 receives load from the fastening tapes 132.

PRIOR ART DOCUMENTS

Patent Documents

Patent Document 1: Japanese Laid-Open Patent Publication No. 2007-335307
Patent Document 2: Japanese Laid-Open Patent Publication No. 2013-48054
Patent Document 3: Japanese Laid-Open Patent Publication No. 2003-187873

SUMMARY OF THE INVENTION

Problems that are to be Solved by the Invention

It is an object of the present invention to provide a power storage device that effectively fastens an electrode assembly.

Means for Solving the Problem

To solve the above problem, a first aspect of the present invention provides a power storage device including an electrode assembly that includes a rectangular positive electrode including a positive electrode active material layer and a rectangular negative electrode including a negative electrode active material layer that are stacked with a separator arranged between the positive electrode and the negative electrode and a case that accommodates the electrode assembly. The positive electrode and the negative electrode each include a tab that projects from one of four sides. A region in which the positive electrode active material layer opposes the negative electrode active material layer is an opposing region. Two end surfaces in a stacking direction of the electrode assembly each include an opposing portion upon which the opposing region is projected as viewed in the stacking direction. Fastening tapes that fasten the electrode assembly are arranged from the opposing portion on one of the end surfaces of the electrode assembly to the opposing portion on the other one of the end surfaces of the electrode assembly. The electrode assembly includes an upper end including the tab of the positive electrode and the tab of the negative electrode, a lower end that opposes the upper end, and side ends that connect the upper end and the lower end. The fastening tapes include first fastening tapes arranged over the upper end of the electrode assembly, second fastening tapes arranged over the lower end of the electrode assembly, and third fastening tapes arranged over the side ends of the electrode assembly. The first fastening tapes are located on the upper end of the electrode assembly at outer sides of two projection positions of the tab of the positive electrode and the tab of the negative electrode. One or more pairs of the first fastening tapes, one or more pairs of the second fastening tapes, and one or more pairs of the third fastening tapes are arranged on the electrode assembly. The first fastening tapes are arranged to partially cover the upper end of the electrode assembly, the second fastening tapes are arranged to partially cover the lower end of the electrode assembly, and the third fastening tapes are arranged to partially cover the side ends of the electrode assembly. The first fastening tapes, the second fastening tapes, and the third fastening tapes are arranged in symmetry in a longitudinal direction of the upper end of the electrode assembly with respect to a center line extending in a vertical direction from a center point of the upper end of the electrode assembly.

In the above structure, the first fastening tapes, the second fastening tapes, and the third fastening tapes are respectively arranged on the electrode assembly in symmetry in the longitudinal direction of the upper end of the electrode assembly with respect to the center line extending in the vertical direction from the center point of the upper end of the electrode assembly. This allows even load to be applied to each of the fastening tapes. Thus, differences are reduced in the load applied to the fastening tapes. This limits the generation of ion deposits resulting from electrical conduction.

EMBODIMENTS OF THE INVENTION

A power storage device according to one embodiment of the present invention will now be described with reference to FIGS. 1 to 4.

Figure 1:
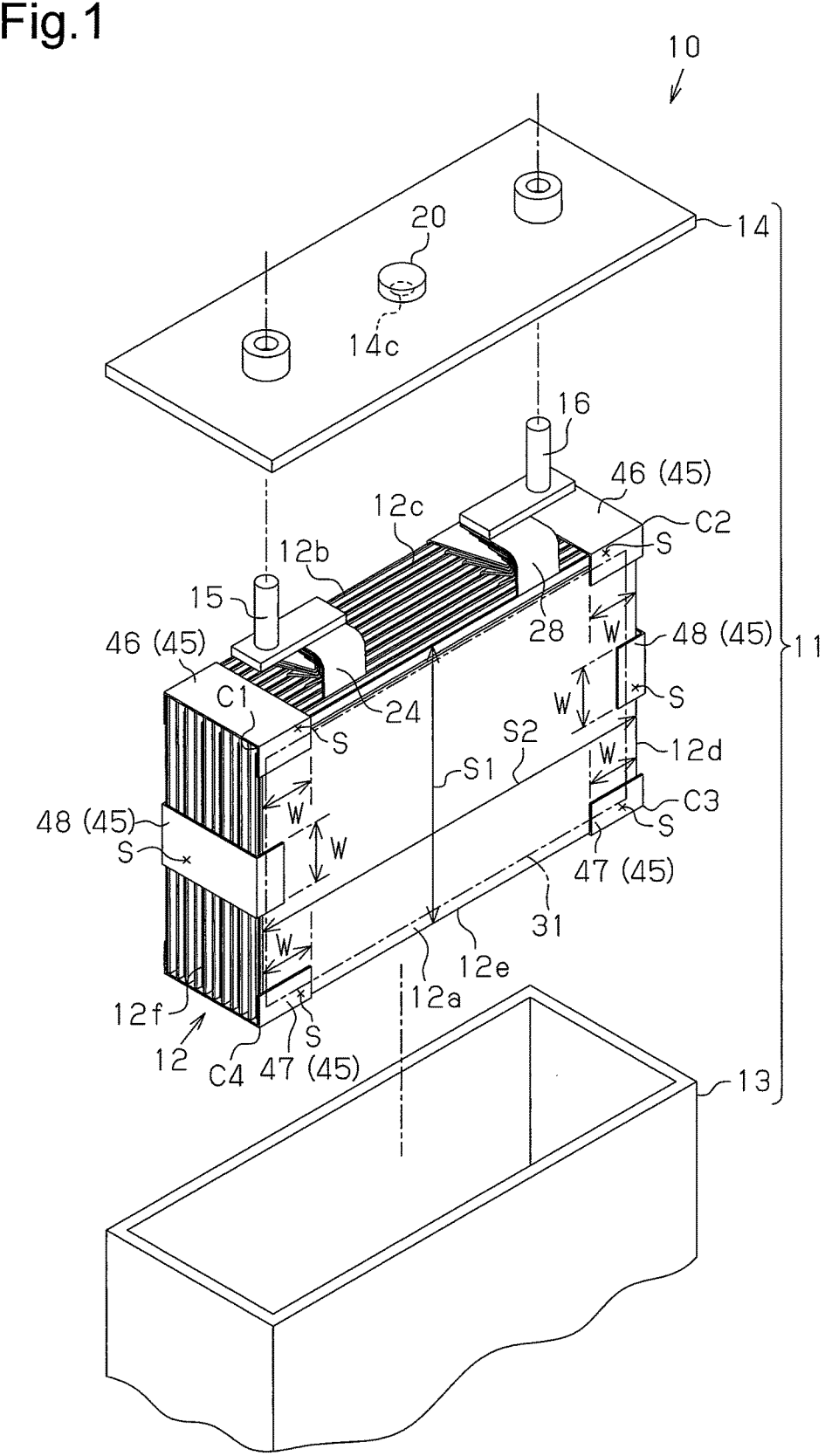
FIG. 1 is an exploded perspective view showing a rechargeable battery of the present embodiment.

As shown in FIG. 1, a rechargeable battery 10 serving as a power storage device includes a case 11 and an electrode assembly 12 that is accommodated in the case 11. In addition to the electrode assembly 12, the case 11 stores an electrolytic solution. The case 11 includes a box-shaped case body 13, which has a closed end, and a flat lid 14. The case body 13 includes an opening into which the electrode assembly 12 is inserted. The lid 14 closes the opening of the case body 13. The lid 14 is a case wall of the case 11. The case body 13 and the lid 14 are formed from, for example, a metal of stainless steel or aluminum. The rechargeable battery 10 is a prismatic lithium-ion battery.

Figure 2:
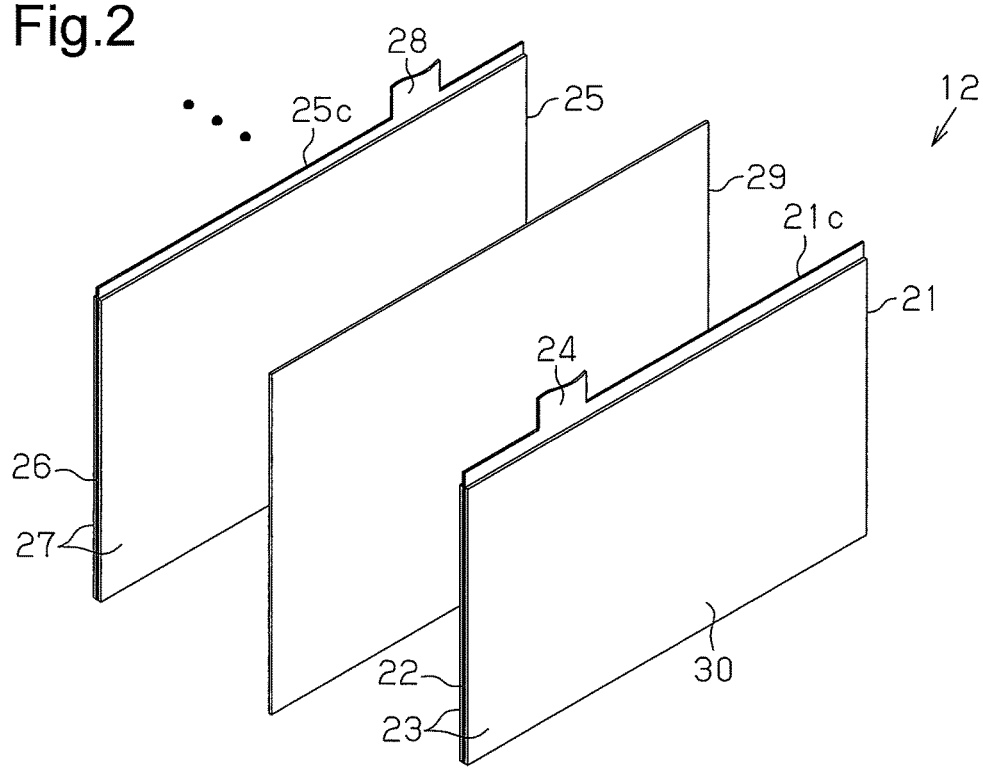
FIG. 2 is an exploded perspective view showing an electrode assembly.

As shown in FIG. 2, the electrode assembly 12 includes positive electrodes 21 and negative electrodes 25 that are alternately stacked with separators 29 arranged between the positive electrodes 21 and the negative electrodes 25. The electrodes 21 and 25 and the separators 29 are each rectangular. The positive electrodes 21 are smaller than the negative electrodes 25. The positive electrodes 21 have shorter sides than the negative electrodes 25. The separators 29 are larger than the negative electrodes 25. The separators 29 have longer sides than the negative electrodes 25.

Each positive electrode 21 includes a rectangular positive electrode metal foil 22 and positive electrode active material layers 23 that are stacked on opposite surfaces of the positive electrode metal foil 22. The positive electrode metal foil 22 is formed by, for example, an aluminum foil. The positive electrode active material layers 23 include positive electrode active materials. The positive electrode active material layers 23 are located in a region of the positive electrode 21 that excludes one side 21c. A positive electrode tab 24 projects from the side 21c of the positive electrode 21.

The negative electrode 25 includes a rectangular negative electrode metal foil 26 and negative electrode active material layers 27 that are stacked on opposite surfaces of the negative electrode metal foil 26. The negative electrode metal foil 26 is formed by, for example, a copper foil. The negative electrode active material layers 27 include negative electrode active materials. The negative electrode metal foil 26 is slightly larger than the positive electrode metal foil 22. The negative electrode active material layers 27 are located in a region of the negative electrode 25 that excludes one side 25c, in which the region is larger than the positive electrode active material layers 23. A negative electrode tab 28 projects from the side 25c of the negative electrode 25.

The electrodes 21 and 25 are stacked so that the tabs 24 and 28 that have the same polarity overlap with one another and the tabs 24 and 28 that have different polarities do not overlap with one another. When the electrodes 21 and 25 and the separators 29 are stacked, the positive electrode active material layers 23 and the negative electrode active material layers 27 are opposed to each other with the separators 29 located between the positive electrode active material layers 23 and the negative electrode active material layers 27. The positive electrode active material layers 23 are entirely covered by the negative electrode active material layers 27 with the separators 29 located in between. The region where the active material layers 23 oppose the active material layers 27 is hereinafter referred to as the opposing region 30. Since the positive electrode active material layers 23 are entirely covered by the negative electrode active material layers 27, the size of the opposing region 30 is equal to the size of the positive electrode active material layers 23. That is, the positive electrode active material layers 23 set the size of the opposing region 30.

Figure 3:
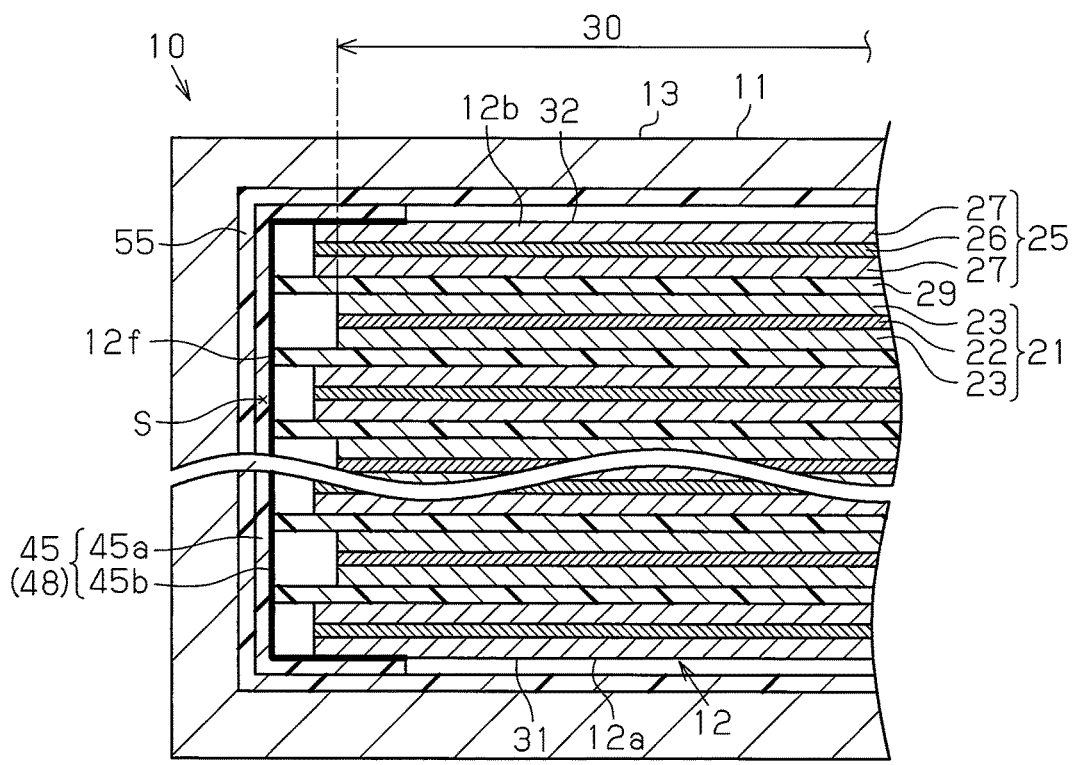
FIG. 3 is a partial cross-sectional view showing the rechargeable battery.

As shown in FIG. 3, the electrode assembly 12 includes two end surfaces 12a and 12b in the stacking direction. One end surface 12a of the electrode assembly 12 includes one opposing portion 31 upon which the opposing region 30 is projected as viewed in the stacking direction. Similarly, the other end surface 12b of the electrode assembly 12 includes the other opposing portion 32 upon which the opposing region 30 is projected as viewed in the stacking direction. The opposing portions 31 and 32 are flat and opposed to each other. The size of each of the opposing portions 31 and 32 is equal to the size of the positive electrode active material layer 23.

As shown in FIG. 1, the rechargeable battery 10 includes four ends in directions orthogonal to the stacking direction of the electrode assembly 12, namely, an upper end 12c, a lower end 12e, and side ends 12d and 12f. The positive electrodes 21 and the negative electrodes 25 are stacked so that the positive electrode tabs 24 and the negative electrode tabs 28 project from the upper end 12c of the rechargeable battery 10. The positive electrode tabs 24 are concentrated at one location and bent from one end toward the other end in the stacking direction of the electrode assembly 12. The location where the positive electrode tabs 24 are overlapped with one another is welded so that the positive electrode tabs 24 are electrically connected to one another. Similarly, the negative electrodes 28 are concentrated and bent at one location. The location in which the negative electrode tabs 28 are overlapped with one another is welded so that the negative electrode tabs 28 are electrically connected to one another.

The rechargeable battery 10 includes a positive electrode terminal 15 that is electrically connected to each of the positive electrode tabs 24 and a negative electrode terminal 16 that is electrically connected to each of the negative electrode tabs 28. The lid 14 includes through holes through which the terminals 15 and 16 are respectively inserted. The terminals 15 and 16 are partially exposed to the outside of the case 11 through the through holes.

The lid 14 includes a liquid intake port 14c through which electrolytic solution is taken into the case 11. The liquid intake port 14c extends through the thickness-wise direction of the lid 14. The liquid intake port 14c is located at a middle position between the projection position of the positive electrode terminal 15 and the projection position of the negative electrode terminal 16 on the lid 14. The liquid intake port 14c is sealed by a sealing cap 20. The sealing cap 20 is fixed to the lid 14. The sealing cap 20 is partially exposed to the outside of the case 11. The sealing cap 20 is formed from a metal, such as stainless steel or aluminum, which is the same as the material of the lid 14.

Six fastening tapes 45 are applied to the electrode assembly 12. The fastening tapes 45 are entirely applied to the electrode assembly 12 from the end surface 12a to the end surface 12b. Thus, the fastening tapes 45 fix the electrode assembly 12 from the end surface 12a to the end surface 12b. Further, the electrode assembly 12 includes a plurality of applied portions S to which the fastening tapes 45 are applied. Thus, the fastening tapes 45 fasten the electrodes 21 and 25 and the separators 29.

As shown in FIGS. 1 and 3, each of the fastening tapes 45 is rectangular and includes a base layer 45a and an adhesive layer 45b, which is formed on one surface of the base layer 45a. The fastening tapes 45 include two first fastening tapes 46, two second fastening tapes 47, and two third fastening tapes 48.

As shown in FIG. 1, the first fastening tapes 46 are applied to the electrode assembly 12 over the upper end 12c of the electrode assembly 12. That is, the first fastening tapes 46 extend over the two end surfaces 12a and 12b of the electrode assembly 12 and partially cover the two ends surfaces 12a and 12b and the upper end 12c.

The second fastening tapes 47 are applied to the electrode assembly 12 over the lower end 12e of the electrode assembly 12. That is, the second fastening tapes 47 extend over the two end surfaces 12a and 12b of the electrode assembly 12 and partially cover the two ends surfaces 12a and 12b and the lower end 12e.

The third fastening tapes 48 are applied to the electrode assembly 12 over the side ends 12d and 12f. That is, the third fastening tapes 48 extend over the two end surfaces 12a and 12b of the electrode assembly 12 and partially cover the two ends surfaces 12a and 12b and the side ends 12d and 12f.

Each of the fastening tapes 46, 47, and 48 partially overlaps with each of the opposing portions 31 and 32. That is, each of the fastening tapes 46, 47, and 48 entirely fastens the electrode assembly 12 from the opposing portion 31 on the end surface 12a of the electrode assembly 12 to the opposing portion 32 on the end surface 12b of the electrode assembly 12. When the electrode assembly 12 is arranged in the case 11, parts of the fastening tapes 46, 47 and 48, that is, parts of the applied portions S, are located between each of the opposing portions 31 and 32 and an inner surface of the case 11. Further, as shown in FIG. 3, an insulator 55 is arranged on an inner surface of the case body 13 of the case 11. When the electrode assembly 12 is arranged in the case 11, the insulator 55 is located between each of the fastening tapes 46, 47, and 48 and the inner surface of the case 11.

As shown in FIG. 1, the portions of the first fastening tapes 46, the second fastening tapes 47, and the third fastening tapes 48 located on the opposing portions 31 and 32 all have the same width W. That is, the width W of the first fastening tapes 46 in the longitudinal direction of the upper end 12c of the electrode assembly 12, the width W of the second fastening tapes 47 in the longitudinal direction of the lower end 12e of the electrode assembly 12, and the width W of the third fastening tapes 48 in the longitudinal direction of the side ends 12d and 12f of the electrode assembly 12 are all the same. Further, the widths of the portions of the first fastening tapes 46, the second fastening tapes 47, and the third fastening tapes 48 respectively covering the upper end 12c, the lower end 12e, and the side ends 12d and 12f of the electrode assembly 12 are all the same.

In the electrode assembly 12, for example, the length S1 of the side ends 12d and 12f is 100 mm, and the length S2 of the upper end 12c and the lower end 12e is 150 mm. The width W of the first fastening tapes 46, the second fastening tapes 47, and the third fastening tapes 48 is, for example, 20 mm. In each of the side ends 12d and 12f of the electrode assembly 12, the region of the length S1 includes a region covered by the third fastening tape 48 and corresponding to the width W of the single third fastening tape 48. In the upper end 12c of the electrode assembly 12, the region of the length S2 includes regions covered by the two first fastening tapes 46 and corresponding to the width W of the two first fastening tapes 46. In the lower end 12e of the electrode assembly 12, the region of the length S2 includes regions covered by the two second fastening tapes 47 and corresponding to the width W of the two second fastening tapes 47.

Thus, in the side ends 12d and 12f of the electrode assembly 12, a region of less than or equal to one-half of the region of the length S1 is covered by the fastening tapes 45. Further, in the upper end 12c and the lower end 12e of the electrode assembly 12, a region of less than or equal to one-half of the region of the length S2 is covered by the fastening tapes 45. That is, the upper end 12c, the lower end 12e, and the side ends 12d and 12f of the electrode assembly 12 are partially covered by the fastening tapes 45. In other words, the upper end 12c, the lower end 12e, and the side ends 12d and 12f of the electrode assembly 12 include portions that are not covered by the fastening tapes 45.

The applied regions S of the two end surfaces 12a and 12b of the electrode assembly 12 to which the fastening tapes 46, 47, and 48 are applied all have the same size. Further, the fastening tapes 46, 47, and 48 are applied to the two end surfaces 12a and 12b so that the applied regions S are located at corresponding positions on the end surface 12a and the end surface 12b of the electrode assembly 12. Conditions in which the applied regions S for the fastening tapes 46, 47, and 48 are located at corresponding positions on the end surface 12a and the end surface 12b of the electrode assembly 12 include, for example, cases in which the applied positions S are located at completely corresponding positions on the two end surfaces 12a and 12b and cases in which the applied positions S are located at positions that differ slightly on the two end surfaces 12a and 12b due to errors that occurred during an applying task.

Figure 4:
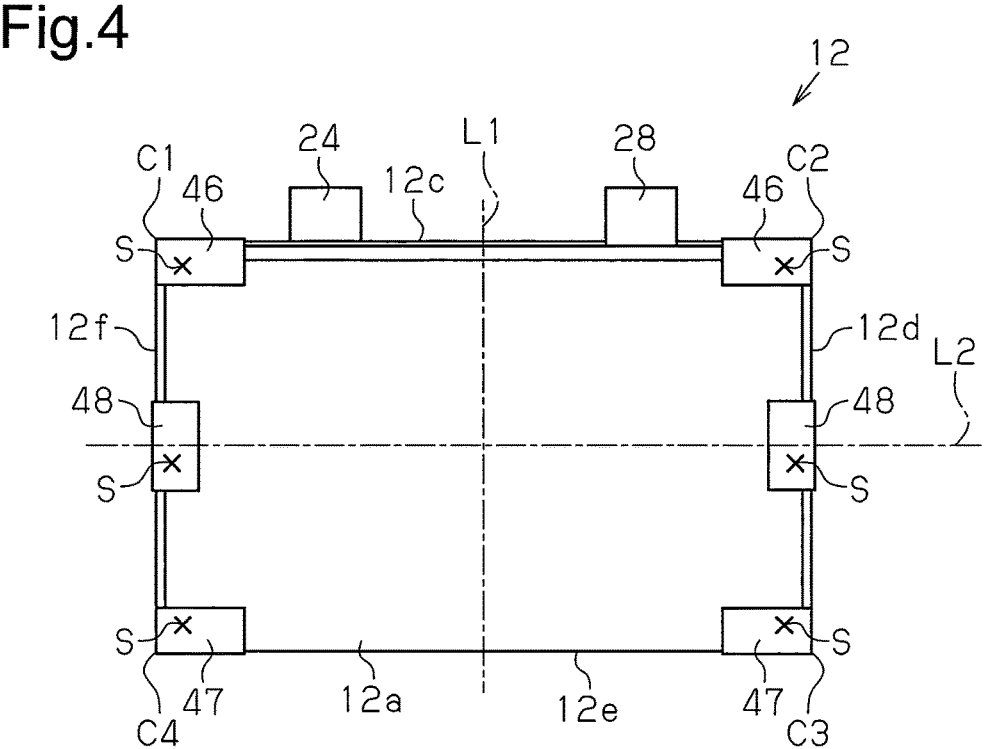
FIG. 4 is a plan view showing the electrode assembly.
Figure 5:
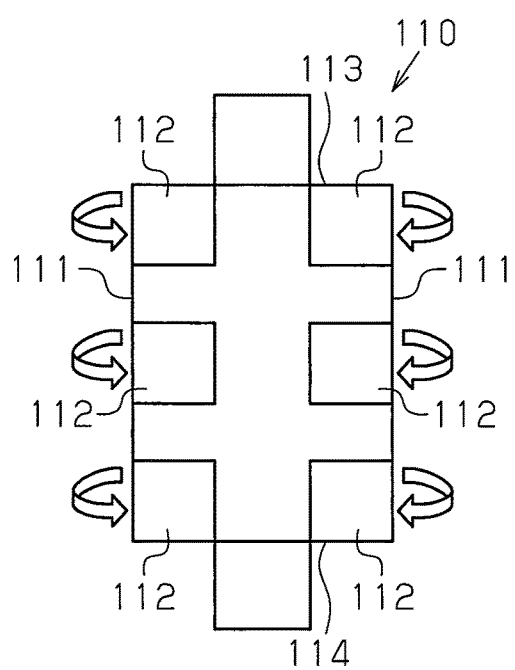
FIG. 5 is a schematic view showing a conventional electrode assembly.
Figure 6:
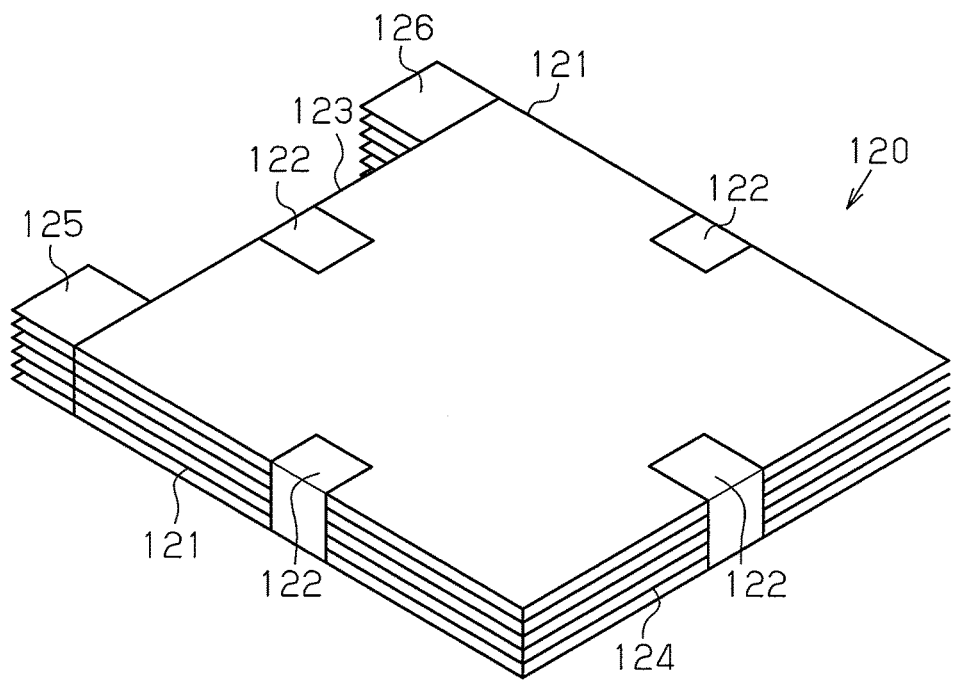
FIG. 6 is a perspective view showing a conventional electrode assembly.
Figure 7:
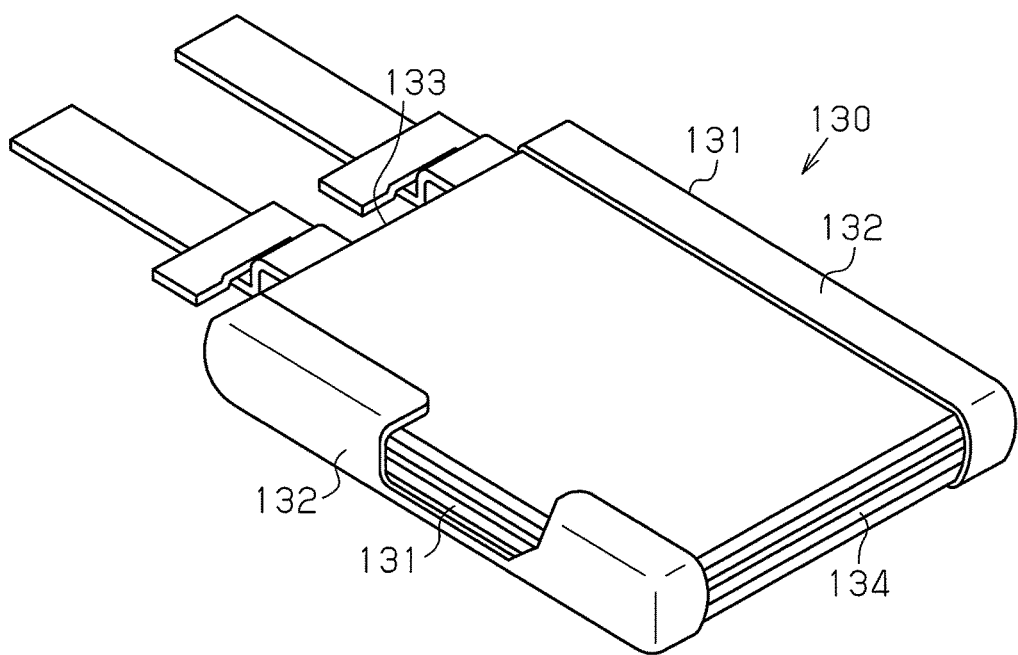
FIG. 7 is a perspective view showing a conventional electrode assembly.

As shown in FIG. 4, the electrode assembly 12 includes four corners C1, C2, C3, and C4. One of the two first fastening tapes 46 is located at one corner C1 of the upper end 12c, and part of an edge of the first fastening tape 46 is applied along the side end 12f of the electrode assembly 12. The other one of the two first fastening tapes 46 is located at the other corner C2 of the upper end 12c, and part of an edge of the first fastening tape 46 is applied along the side end 12d of the electrode assembly 12. In this case, parts of the edges of the first fastening tapes 46 may be applied to correspond to the side ends 12d and 12f of the electrode assembly 12 and may be applied at positions slightly separated from the side ends 12d and 12f of the electrode assembly 12.

The two first fastening tapes 46 are located on the upper end 12c of the electrode assembly 12 at the outer sides of the two projection positions of the positive electrode tab 24 and the negative electrode tab 28. In other words, the first fastening tapes 46 are not arranged at a middle position between the projection position of the positive electrode tab 24 and the projection position of the negative electrode tab 28 on the upper end 12c of the electrode assembly 12. Further, as shown in FIG. 1, the liquid intake port 14c is located at the middle position between the projection position of the positive electrode terminal 15 and the projection position of the negative electrode terminal 16 on the lid 14 of the case 11. That is, as viewed from the lid 14, the middle position between the projection position of the positive electrode tab 24 and the projection position of the negative electrode tab 28 on the upper end 12c of the electrode assembly 12 overlaps with the position of the liquid intake port 14c. Thus, as viewed from the lid 14, the liquid intake port 14c is located at a position that does not overlap with the fastening tapes 46.

As shown in FIG. 4, one of the two second fastening tapes 47 is located at one corner C4 of the lower end 12e, and part of an edge of the second fastening tape 47 is applied along the side end 12f of the electrode assembly 12. The other one of the two second fastening tapes 47 is located at the other corner C3 of the lower end 12e, and part of an edge of the second fastening tape 47 is applied along the side end 12d of the electrode assembly 12. In this case, parts of the edges of the second fastening tapes 47 may be applied to correspond to the side ends 12d and 12f of the electrode assembly 12 and may be applied at positions slightly separated from the side ends 12d and 12f of the electrode assembly 12.

One of the two third fastening tapes 48 is located on the side end 12f of the electrode assembly 12 at a middle position between the corner C1 and the corner C4. The other one of the two third fastening tapes 48 is located on the side end 12d of the electrode assembly 12 at a middle position between the corner C2 and the corner C3.

A virtual line L1 shows the middle position of the side ends 12d and 12f of the electrode assembly 12. The virtual line L1 is a center line extending in the vertical direction from each of the center points of the upper end 12c and the lower end 12e of the electrode assembly 12. The two first fastening tapes 46, the two second fastening tapes 47, and the two third fastening tapes 48 are each arranged in pairs on the electrode assembly 12. The first fastening tapes 46, the second fastening tapes 47, and the third fastening tapes 48 are respectively arranged in symmetry in the sideward direction with respect to the virtual line L1. A virtual line L2 shows the middle position of the upper end 12c and the lower end 12e of the electrode assembly 12. The virtual line L2 is a center line extending in the sideward direction from each of the center points of the side ends 12d and 12f of the electrode assembly 12. The first fastening tapes 46 are arranged in symmetry with the second fastening tapes 47 in the vertical direction with respect to the virtual line L2. The third fastening tapes 48 are arranged in symmetry in the vertical direction with respect to the virtual line L2. That is, the fastening tapes 45 are arranged in symmetry in the vertical direction with respect to the virtual line L2. In the present embodiment, the sideward direction refers to the longitudinal direction of the upper end 12c and the lower end 12e of the electrode assembly 12, and the vertical direction refers to the longitudinal direction of the side ends 12d and 12f of the electrode assembly 12.

The operation of the rechargeable battery 10 will now be described with respect to FIGS. 1 and 4.

As shown in FIGS. 1 and 4, the first fastening tapes 46, the second fastening tapes 47, and the third fastening tapes 48 are arranged in symmetry in the sideward direction with respect to the virtual line L1. Further, the first fastening tapes 46, the second fastening tapes 47, and the third fastening tapes 48 are arranged in symmetry in the vertical direction with respect to the virtual line L2. This reduces the difference in the load applied to each of the fastening tapes 45.

The first fastening tapes 46 are applied over the upper end 12c of the electrode assembly 12. The second fastening tapes 47 are applied over the lower end 12e of the electrode assembly 12. The third fastening tapes 48 are applied over the side ends 12d and 12f of the electrode assembly 12. This restricts movement of the electrodes 21 and 25 in the vertical direction and the sideward direction of the electrode assembly 12.

The first fastening tapes 46 are located on the upper end 12c of the electrode assembly 12 at the outer sides of the two projection positions of the positive electrode tab 24 and the negative electrode tab 28. In other words, the fastening tapes 45 are not applied to the portion between the projection position of the positive electrode tab 24 and the projection position of the negative electrode tab 28 on the upper end 12c of the electrode assembly 12. This advances impregnation of the electrode assembly 12 with electrolytic solution from the middle portion of the upper end 12c of the electrode assembly 12 into between the electrodes 21 and 25.

The first fastening tapes 46, the second fastening tapes 47, and the third fastening tapes 48 are applied to the electrode assembly 12 to partially cover the upper end 12c, the lower end 12e, and the side ends 12d and 12f of the electrode assembly 12. Thus, the upper end 12c, the lower end 12e, and the side ends 12d and 12f of the electrode assembly 12 include portions to which the fastening tapes 45 are not applied.

The present embodiment has the advantages described below.

(1) The fastening tapes 45 are applied to the electrode assembly 12 in symmetry in the sideward direction with respect to the virtual line L1. This allows even load to be applied to each of the fastening tapes 45 applied to the electrode assembly 12. Thus, differences are reduced in the load applied to the fastening tapes 45. This limits the generation of ion deposits resulting from electrical conduction.

(2) The fastening tapes 45 fasten the upper end 12c, the lower end 12e, and the side ends 12d and 12f of the electrode assembly 12. This limits displacement of each of the electrodes 21 and 25 of the electrode assembly 12.

(3) The two first fastening tapes 46 are located on the upper end 12c of the electrode assembly 12 at the outer sides of the two projection positions of the positive electrode tab 24 and the negative electrode tab 28. This limits situations in which the fastening tapes 45 hinder the impregnation of the portion between the electrodes 21 and 25 with electrolyte solution.

(4) The applied fastening tapes 45 partially cover the upper end 12c, the lower end 12e, and the side ends 12d and 12f of the electrode assembly 12. Thus, as compared to when the fastening tapes 45 are entirely applied to the upper end 12c, the lower end 12e, and the side ends 12d and 12f of the electrode assembly 12, the applied regions S are smaller when the fastening tapes 45 are applied to the upper end 12c, the lower end 12e, and the side ends 12d and 12f of the electrode assembly 12. This reduces the range of the electrode assembly 12 that receives load from the fastening tapes 45.

(5) The fastening tapes 45 are applied to the electrode assembly 12 in symmetry in the vertical direction with respect to the virtual line L2. This allows even load to be applied to each fastening tape 45 applied to the electrode assembly 12. This further reduces differences in the load applied to the fastening tapes 45.

(6) The first fastening tapes 46 are located at the corners C1 and C2 of the electrode assembly 12, and the second fastening tapes 47 are located at the corners C3 and C4 of the electrode assembly 12. This simplifies tasks when applying the first fastening tapes 46 and the second fastening tapes 47 to the electrode assembly 12 to be symmetrical in the sideward direction with respect to the virtual line L1.

(7) The first fastening tapes 46, the second fastening tapes 47, and the third fastening tapes 48 all have the same width W. In this case, the same tape can be cut to a predetermined length and used as the first fastening tape 46, the second fastening tape 47, and the third fastening tape 48. This increases the efficiency for applying the fastening tapes 45 and reduces the manufacturing cost.

(8) As viewed from the lid 14, the liquid intake port 14c is located at a position separated from the first fastening tapes 46. Thus, the electrolytic solution entering the case 11 through the liquid intake port 14c is not interfered with by the fastening tapes 45. Accordingly, the portion between the electrodes 21 and 25 is easily impregnated with the electrolytic solution. This further limits situations in which the fastening tapes 45 hinder the impregnation of the portion between the electrodes 21 and 25 with electrolyte solution.

The above embodiment may be modified as follows.

Two pairs or more of some or all of the first fastening tapes 46, the second fastening tapes 47, and the third fastening tapes 48 may be partially or entirely applied to the electrode assembly 12. In this case, the first fastening tapes 46, the second fastening tapes 47, and the third fastening tapes 48 partially cover the upper end 12c, the lower end 12e, and the side ends 12d and 12f of the electrode assembly 12. That is, the upper end 12c, the lower end 12e, and the side ends 12d and 12f of the electrode assembly 12 include portions to which the fastening tapes 45 are not applied. Further, the first fastening tapes 46, the second fastening tapes 47, and the third fastening tapes 48 are applied to the electrode assembly 12 in symmetry with respect to the virtual line L1 and the virtual line L2.

The width W of the portions of the first fastening tapes 46, the second fastening tapes 47, and the third fastening tapes 48 located on the opposing portions 31 and 32 may differ from the width of the portions that cover the upper end 12c, the lower end 12e, and the side ends 12d and 12f of the electrode assembly 12. In this case, the portions of the first fastening tapes 46, the second fastening tapes 47, and the third fastening tapes 48 located on the opposing portions 31 and 32 all have the same width W. The portions of the first fastening tapes 46, the second fastening tapes 47, and the third fastening tapes 48 that cover the upper end 12c, the lower end 12e, and the side ends 12d and 12f of the electrode assembly 12 may all have the same width or different widths.

The widths W of the first fastening tapes 46, the second fastening tapes 47, and the third fastening tapes 48 do not all have to be the same. For example, the width W of the first fastening tapes 46 may be the same as the width W of the second fastening tapes 47, and the width of the third fastening tapes 48 may differ from the width W of the first fastening tapes 46 and the second fastening tapes 47. In this case, the first fastening tapes 46, the second fastening tapes 47, and the third fastening tapes 48 are applied to the electrode assembly 12 in symmetry with respect to the virtual line L1 and the virtual line L2. In this case, advantages (1) to (6) and (8) of the above embodiment are obtained. Further, the first fastening tapes 46, the second fastening tapes 47, and the third fastening tapes 48 may all have different widths W so that the first fastening tapes 46 and the second fastening tapes 47 have different widths W. In this case, the first fastening tapes 46, the second fastening tapes 47, and the third fastening tapes 48 are applied to the electrode assembly 12 in symmetry with respect to the virtual line L1. This embodiment has advantages (1) to (4), (6), and (8).

The third fastening tapes 48 may be applied to the side ends 12d and 12f of the electrode assembly 12 at a position separated from the middle position between the corners C1 and C4 and at a position separated from the middle position between the corners C2 and C3. In this case, the first fastening tapes 46, the second fastening tapes 47, and the third fastening tapes 48 are applied to the electrode assembly 12 in symmetry with respect to the virtual line L1. This embodiment has advantages (1) to (4), (6), and (8).

The liquid intake port 14c of the lid 14 may be arranged at the outer sides of the two projection positions of the positive electrode terminal 15 and the negative electrode terminal 16 so that the liquid intake port 14c overlaps with the first fastening tapes 46 as viewed from the lid 14. This embodiment still has advantages (1) to (7) of the above embodiment.

The liquid intake port 14c may be formed in the case wall of the case body 13. This embodiment still has advantages (1) to (7) of the above embodiment.

The negative electrodes 25 and the separator 29 may have the same size.

The positive electrodes 21 and the negative electrodes 25 may have the same size.

A foil formed from a metal other than aluminum may be used as the positive electrode metal foil 22.

A foil formed from a metal other than copper may be used as the negative electrode metal foil 26.

The positive electrode active material layer 23 may be arranged on the entire region of the positive electrode 21 excluding the positive electrode tab 24.

The positive electrode active material layer 23 may be arranged on only one surface of the positive electrode 21.

The negative electrode active material layer 27 may be arranged on the entire region of the negative electrode 25 excluding the negative electrode tab 28.

The negative electrode active material layer 27 may be arranged on only one surface of the negative electrode 25.

The rechargeable battery 10 may be a rechargeable battery other than a lithium-ion rechargeable battery. That is, any rechargeable battery can be used as long as ions are moved and electric charge is transferred between the positive electrode active material layer and the negative electrode active material layer.

The shape of the case 11 may be changed to be, for example, cylindrical.

The present invention may be applied to a power storage device such as an electric double-layer capacitor.

The invention claimed is:

1. A power storage device comprising:
an electrode assembly that includes a rectangular positive electrode including a positive electrode active material layer and a rectangular negative electrode including a negative electrode active material layer that are stacked with a separator arranged between the positive electrode and the negative electrode; and
a case that accommodates the electrode assembly, wherein
the positive electrode and the negative electrode each include a tab that projects from one of four sides,
a region in which the positive electrode active material layer opposes the negative electrode active material layer is an opposing region,
two end surfaces in a stacking direction of the electrode assembly each include an opposing portion upon which the opposing region is projected as viewed in the stacking direction,
fastening tapes that fasten the electrode assembly are arranged from the opposing portion on one of the end surfaces of the electrode assembly to the opposing portion on the other one of the end surfaces of the electrode assembly,
the electrode assembly includes an upper end including the tab of the positive electrode and the tab of the negative electrode, a lower end that opposes the upper end, and side ends that connect the upper end and the lower end,
the fastening tapes include: two first fastening tapes arranged over the upper end of the electrode assembly, two second fastening tapes arranged over the lower end of the electrode assembly, and two third fastening tapes arranged over the side ends of the electrode assembly,
one of the first fastening tapes is located on the upper end of the electrode assembly at an outer side of the positive electrode tab and the other one of the first fastening tapes is located on the upper end of the electrode assembly at an outer side of the negative electrode tab,
one of the second fastening tapes is located at the lower end of the electrode assembly at the outer side of the positive electrode tab and the other one of the second fastening tapes is located at the lower end of the electrode assembly at the outer side of the negative electrode tab,
one of the third fastening tapes is located over the side end of the electrode assembly at the outer side of the positive electrode tab and the other one of the third fastening tapes is located over the side end of the electrode assembly at the outer side of the negative electrode tab,
the first fastening tapes are arranged to partially cover the upper end of the electrode assembly, the second fastening tapes are arranged to partially cover the lower end of the electrode assembly, and the third fastening tapes are arranged to partially cover the side ends of the electrode assembly,
the first fastening tapes, the second fastening tapes, and the third fastening tapes are arranged in symmetry in a longitudinal direction of the upper end of the electrode assembly with respect to a center line extending in a vertical direction from a center point of the upper end of the electrode assembly, and
an insulator is arranged between the case and the fastening tapes arranged at the side end of the electrode assembly, the lower end of the electrode assembly, and the two end surfaces in the stacking direction of the electrode assembly.

2. The power storage device according to claim 1, wherein the two first fastening tapes are respectively located at two corners of the upper end of four corners of the electrode assembly so that part of an edge of the first fastening tape is applied along the side end of the electrode assembly, and the two second fastening tapes are respectively located at two corners of the lower end of the four corners of the electrode assembly so that part of an edge of the second fastening tape is applied along the side end of the electrode assembly.

3. The power storage device according to claim 1, wherein the two first fastening tapes are arranged at the two corners of the upper end of the electrode assembly to cover a corner portion of the opposing portion, and
the two second fastening tapes are arranged at the two corners of the lower end of the electrode assembly to cover a corner portion of the opposing portion.

4. The power storage device according to claim 1, wherein the fastening tapes are arranged in symmetry in a longitudinal direction of each side end of the electrode assembly with respect to a center line extending in a sideward direction from a center point of each side end of the electrode assembly.

5. The power storage device according to claim 1, wherein portions of the first fastening tapes, the second fastening tapes, and the third fastening tapes located on the opposing portion all have the same width.

6. The power storage device according to claim 1, wherein the case is formed by a case wall,
the case wall includes a liquid intake port through which electrolytic solution is taken into the case, and
the liquid intake port is arranged at a position separated from the first fastening tapes as viewed from the case wall.

7. The power storage device according to claim 1, wherein the power storage device is a rechargeable battery.

* * * * *